United States Patent [19]

Tehan et al.

[11] 4,259,542
[45] Mar. 31, 1981

[54] POKE-THROUGH ELECTRICAL FITTING

[75] Inventors: James F. Tehan, Naugatuck; Robert L. Bradley, Burlington, both of Conn.

[73] Assignee: General Signal Corporation, Stamford, Conn.

[21] Appl. No.: 17,504

[22] Filed: Mar. 5, 1979

[51] Int. Cl.³ ............................................ H02G 3/22
[52] U.S. Cl. ........................................ 174/48; 248/56
[58] Field of Search ................ 174/48, 49, 151, 65 R; 169/48; 248/56

[56] References Cited

U.S. PATENT DOCUMENTS

| | | | |
|---|---|---|---|
| 1,850,792 | 3/1932 | Frederickson | 174/65 R |
| 1,851,940 | 3/1932 | Williams | 248/56 X |
| 2,276,818 | 3/1942 | Bellows | 174/65 R X |
| 3,779,585 | 12/1973 | Handzlik | 248/56 X |
| 3,803,341 | 4/1974 | Klinkman et al. | 174/48 |
| 3,995,102 | 11/1976 | Kohaut | 174/48 |
| 4,021,604 | 5/1977 | Dola et al. | 174/65 R X |
| 4,061,344 | 12/1977 | Bradley et al. | 248/56 X |

*Primary Examiner*—B. A. Reynolds
*Assistant Examiner*—D. A. Tone

*Attorney, Agent, or Firm*—Milton E. Kleinman; George W. Killian

[57] ABSTRACT

A poke-through electrical fitting for protecting and supporting a wire or cable as it passes through a fire rated barrier and which will fit through a standard knock out of an electrical fitting box which is one and three-eighths inches in diameter and which, in the trade, is called a one inch knock out. The fitting does not require an electrical fitting box on both sides of the barrier. The device comprises an elastomeric grommet having an appropriately sized transverse hole and a slit from the outer periphery to the hole for permitting opening of the grommet and laying in of the wire or cable. An upper and lower compression plate is provided on each end of the grommet and coupling screws are provided for compressing the grommet between the compression plates to cause the elastomeric grommet to grasp the wire and close the passageway through the barrier. The lower compression plate has a clamp for clamping and supporting any cable of the size range which may be accommodated by the device. The device provides through ground continuity, and prevents the passage of liquids, fire, smoke and related products of combustion, and provides support for the electrical fitting box.

12 Claims, 7 Drawing Figures

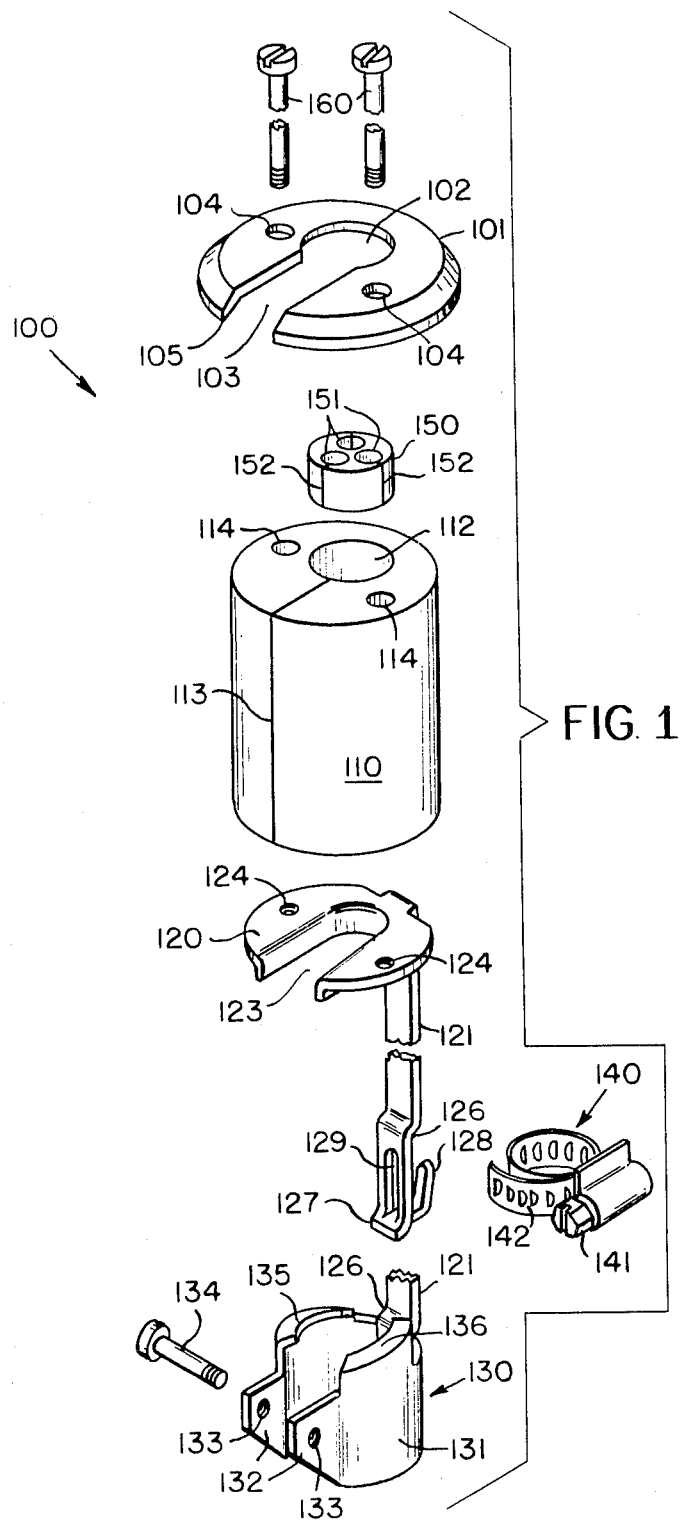
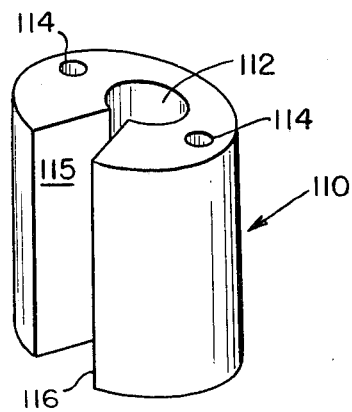
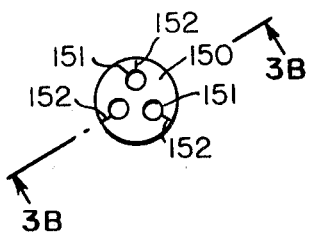
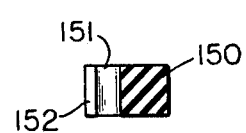
FIG. 1
FIG. 2
FIG. 3A
FIG. 3B

POKE-THROUGH ELECTRICAL FITTING

BACKGROUND OF THE INVENTION

In commercial, manufacturing and office buildings, there is a frequent need to change, add or modify wiring to accommodate changing circumstances. The electrical fitting described herein is designed for use in situations wherein it is necessary to pass electrical conductors or cables through a wall, floor or the like which may be fabricated of concrete or other material to provide the required strength and/or to serve as a fire barrier. Sometimes the necessary openings or holes are provided as the concrete is originally poured and sometimes the necessary passageways are obtained by drilling or other means. It is common practice to provide a junction box on each side of the passageway.

A wide variety of devices have been developed and employed to satisfy the variety of circumstances to be accommodated. Examples of prior art structures include U.S. Pat. Nos. 3,803,341 and 3,995,102 issued Apr. 9, 1974 to Klinkman et al. and Nov. 30, 1976 to Kohaut, respectively. Other devices are disclosed in U.S. Pat. Nos. 3,751,576; 3,965,629; 3,965,291; 4,091,231 and 4,099,020.

While these devices serve as described in their respective specifications, it will be seen that the present device affords various advantages in economy, features, ease of installation, and more convenient removal when and if required. In addition, the present device provides an effective barrier to liquids and products of combustion at all times.

SUMMARY OF THE INVENTION

The structure of the present invention comprises an electrical fitting, all components of which may be completely assembled at the factory and quickly and conveniently inserted in a passageway through a fire barrier such as a concrete floor, or wall, by a single craftsman. The hole or passageway through the floor may have any shape, although it is anticipated that in the usual application the passageway will comprise a cylindrical hole. The electrical fitting comprises three major elements, an upper compression plate, a resilient grommet, and a lower compression plate. These elements are held together by screws which pass through the upper compression plate and the resilient grommet and are threaded into the lower compression plate. Coupled to the lower compression plate is a leg and means for providing mechanical support for the cable or wire to be passed through the fitting. An important feature of the invention resides in the fact that the device measures only one and three-eighths inches in diameter and, therefore, the device may be used with any junction box which is provided with a standard one inch trade size knock-out which actually measures one and three-eighths inches. Prior art poke-through devices were considerably larger and, therefore, required special junction boxes and larger holes through the barrier. Another feature of the invention resides in the fact that it may be used with telephone cables equipped with an Amphenol plug. Another feature of the invention resides in the fact that the wire or cable to pass through the poke-through device may be laid into the poke-through device rather than pushed through an opening of the device. This is particularly useful when it is desired to use the poke-through device with a telephone cable having an Amphenol connector attached. This feature is achieved by providing a central hole in the resilient grommet and a cut from the periphery of the grommet to the central hole. In addition, an appropriately dimensioned slot is provided in the upper and lower compression plates so that they are, in effect, "U" shape. By this means the resilient grommet may be spread open and the cable laid therein. The poke-through fitting is then pressed into the hole in the floor and the screws between the upper and lower compression plates tightened to cause the resilient grommet to clamp on the cable and spread out to the walls of the opening through the barrier, thereby providing an effective seal against fire or other products of combustion.

A variety of clamps are disclosed coupled to the lower compression plate. A single clamp may be used for clamping armored cables ranging in size from an outer diameter of three-eighths of an inch to one inch. In some applications, a standard hose clamp may be used.

Another feature of the invention resides in the fact that no junction box is required at the lower end of the fitting and that the fitting provides a through ground connection.

It is a principal object of this invention to provide a new and improved poke-through device for use in supporting and protecting a wire, or cable, passing through a barrier such as a fire rated barrier.

It is a more particular object of the invention to provide a poke-through device which may be used with a minimum size hole through the barrier.

It is another object of the invention to provide a poke-through device which may be used with a standard one inch knock-out.

It is another object of the invention to provide a poke-through device which will accommodate flexible conduit up to one inch in outside diameter.

It is another object of the invention to provide a structure which will provide through ground continuity.

It is another object of the invention to provide barrier integrity for preventing the passage of fire or other products of combustion from one side of the barrier to the other.

It is another object of the invention to provide a poke-through device with a lay-in feature whereby cables with attached plugs may be accommodated.

It is another object of the invention to provide an associated cable clamp which will grip and support the full range of armored cables or flexible metal conduits which may be used.

BRIEF DESCRIPTION OF THE DRAWING

In the drawings:

FIG. 1 comprises an exploded view of the principal elements of the device;

FIG. 2 comprises an isometric view of the resilient grommet showing it spread open for the laying in of a cable;

FIGS. 3A and 3B comprises a top and section view of an insert for accommodating individual wires of a power cable;

DESCRIPTION OF THE PREFERRED EMBODIMENTS

Figure 4A:
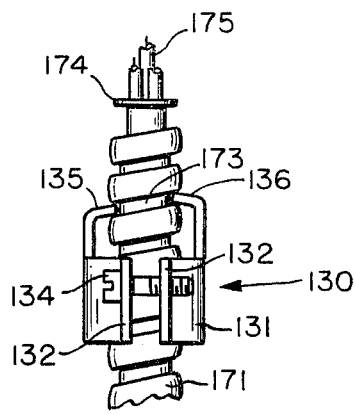
FIGS. 4A and 4B show how a single clamp may be used for supporting different sizes of flexible conduit.

Referring now more specifically to FIG. 1, there will be seen an exploded view of the electrical fitting 100 of the invention. The electrical fitting 100 includes as major components an upper compression plate 101, an elastomeric grommet 110 and a lower compression plate 120 having a tail 121. Coupled to the tail 121 may be a cable clamp 130 or a cable clamp 140. In addition, a plug 150 may be used in certain assemblies. Screws 160 secure the grommet 110 between the upper and lower clamping plates 101 and 120, respectively.

As may be seen, the upper compression plate 101 is generally planar in construction and has a circular cut out 102 and a slot 103. For reasons to be explained more fully hereinafter, the circular cut out 102 is off center with respect to the center of the upper compression plate 101. In addition, the upper compression plate 101 includes a pair of holes 104 for accommodating the bolts 160. In a preferred embodiment, the upper compression plate includes a turned down edge 105 which serves a function to be described more fully hereinafter.

The elastomeric grommet may be fabricated of any suitable material which has the required characteristics. More specifically, the grommet 110 should have sufficient elasticity to permit deformation of the type shown in FIGS. 2 and 5. In addition, the grommet 110 should be selected to provide a seal which will maintain its integrity over a wide temperature range and in the presence of a variety of ambient atmospheric conditions. Possibly different materials will be used for different applications. The grommet 110 includes a hole 112 which is usually cylindrical and which extends the entire length of the grommet 110. The grommet 110 also includes a slit 113 which extends from the outer perimeter to the hole 112. As may be seen in FIG. 1, the center of the hole 112 does not coincide with the center of the cylindrical grommet 110. However, when the various components are assembled, the center of the circular cut out 102 and the hole 112 are in axial alignment. In addition, the grommet 110 includes holes 114 for accommodating the bolts 160. The lower compression plate 120 includes a slot 123 which, when the various components are assembled, is aligned with the slot 103. The lower compression plate 120 also includes holes 124 which are threaded to accommodate the bolts 160. The tail 121 may include an offset 126 and a lip 127. In addition, the tail 121 may include a punched out tang 128 which will serve to hold the clamp 140 in a manner to be described more fully hereinafter. Coupled to the lower end of the tail 121 may be a cable clamp 130 having a generally cylindrical outer surface 131 and wings 132 having holes 133 one of which is threaded. The bolt 134 passes through the unthreaded hole 133 and is threaded into the threaded hole 133. The cable clamp 130 also includes upper spiral clamps 135 and 136 which will serve a function to be described more fully hereinafter. The cable clamp 130 could be fabricated as an integral part of the tail 121 or may be coupled thereto by spot welding or other suitable means, or could be separable. An alternate cable clamp 140 may be used in lieu of the cable clamp 130. The cable clamp 140 may comprise a standard hose clamp which includes a wormdrive screw 141 which will advance the end of the band 142 and alter the circumferential perimeter of the area enclosed by the cable clamp 140. In a standard assembly, the cable clamp 140 would pass through the space 129 formed by the tang 128. This helps assure proper positioning of the clamp 140 and prevents its accidental loss from the assembly. If it should be necessary to remove the clamp 140, the wormdrive screw 141 may be loosened to open the clamp 140.

As may be seen more clearly in FIG. 2, the grommet 110 is fabricated of an elastomeric material, and in view of the elastomeric properties of the material, the slit 113 may be opened to expose the faces 115 and 116 and provide an opening into the hole 112 whereby an elongated device, such as a wire, may be laid into the hole 112.

In selected situations, a plug 150 (FIGS. 1, 3A and 3B) may be inserted in the hole 112 of the grommet 110. As may be seen, the plug 151 may include one or more holes 151 each of which is coupled to the exterior of the plug 150 by a slit 152. Usually the plug 150 would be fabricated of the same material as the grommet 110. A suitable plug 150 is used to accommodate the number of wires to be passed through the fitting. Due to the elasticity of the plug and grommet, a plug may be used to accommodate more than one wire size.

Figure 4B:
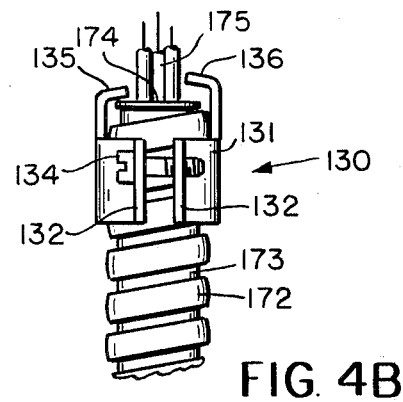

FIGS. 4A and 4B will be described in more detail hereinafter, but illustrate the manner in which the cable clamp 130 may be used to secure an armored cable 171 of a relatively small diameter or an armored cable 172 of a larger diameter.

Figure 5:
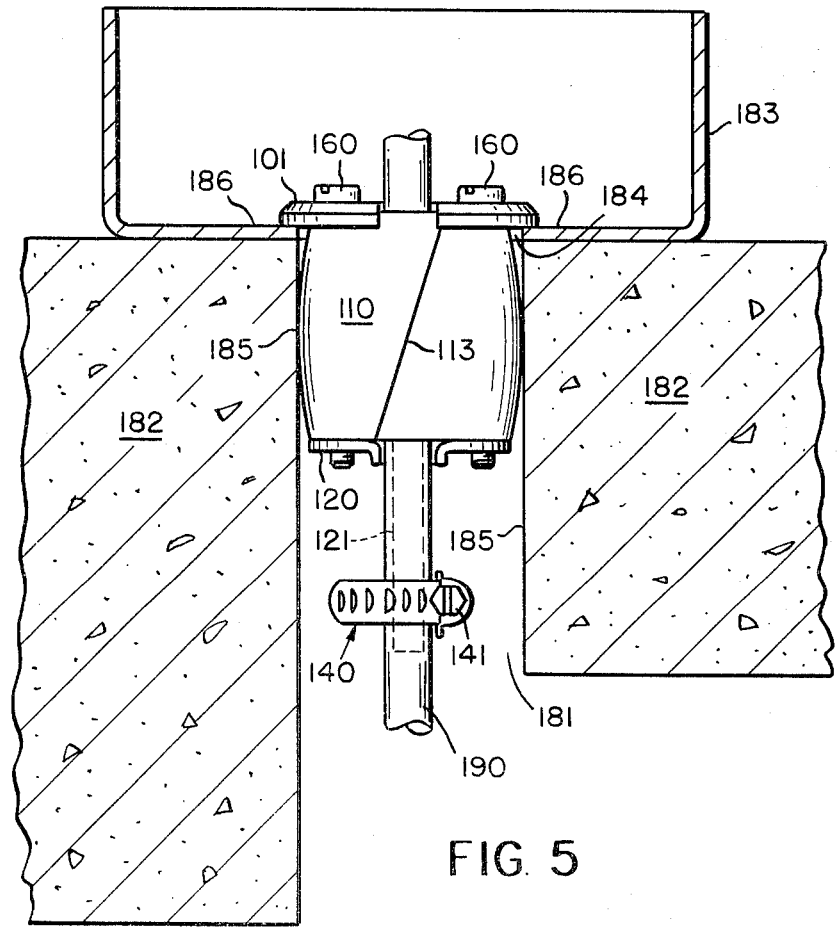
FIG. 5 illustrates an in place assembly in partial cross section.

FIG. 5 illustrates the electrical fitting 100 inserted through a hole 181 in a concrete barrier 182 and securing a junction box 183 to the barrier 182.

The electrical fitting device 100 is particularly and specifically designed for use in passing telephone cables or lighting and appliance wiring through fire rated barriers without reducing the effectiveness of the barrier and while permitting the use of a hole through the barrier which does not exceed the diameter of a standard one inch trade size knock-out in a junction box. This diameter is one and three-eighths inches. Notwithstanding the limited size of the hole through the barrier, cables, such as armored cables, having an outside diameter of up to one inch may be accommodated.

The electrical fitting 100 as provided by the factory may comprise the upper compression plate 101, the grommet 110, the lower compression plate 120, one or the other of the cable clamps 130 or 140, one or more plugs 150, and the bolts 160 all loosely assembled with the bolts 160 passing through the holes 104, 114, and threaded into the holes 124.

For the purpose of the present illustration, it will be assumed that an armored cable having a relatively small outside diameter is to be passed from one side of a barrier through a hole to the other side. The installer would begin by drilling a hole approximately one and three-eighths inches in diameter, and passing an end of the armored cable from one side of the barrier to the side on which it is desired to provide a junction box. The armored cable would be prepared in the well known manner by stripping sufficient armor from the cable to expose at least eight inches of the conductors and, as is the custom in the trade, an anti-short bushing, conventionally referred to as a "red-head" would be inserted into the cut end of the armor. The prepared end of the armored cable is then passed through a hole in the junction box from which a knock-out measuring one and three-eighths inches in diameter has been removed.

Next, the electrical fitting 100, pre-assembled as above described, is obtained and if the cable clamp 140 is provided, the cable is slipped through the clamp 140. If the cable clamp 130 is provided, the screw 134 will be removed and the armored cable laid into the cable clamp 130. Then, for either assembly, the grommet 110 is laid open in the manner illustrated in FIG. 2. The conductors are laid in the slot 123 and the slit 113 and into the hole 112 of the grommet 110 and through the slot 103 and the circular cut out 102 of the upper compression plate 101. If the armored cable 171 is one of the smaller sizes to be accommodated, it would be extended slightly beyond the spiral clamps 135 and 136 of the cable clamp 130 all in the manner as more specifically illustrated in FIG. 4A. As may be seen in FIG. 4A, the spiral clamps 135 and 136 are preformed and contoured to engage with the spiral groove 173 of the armored cable 171. 174 represents the anti-short red-head bushing. The individual conductors 175 extend through the hole 112 of the grommet 110.

When the screw 134 is reinserted and tightened, the spiral clamps 135 and 136 securely and frictionally engage with the spiral groove 173 of the armored cable 171 and support and secure the armored cable. It will be noted that the inner surface of the cylindrical surface 131 does not grip the armored cable 171.

A plug 150 having an appropriate number of holes 151 to accommodate the number of conductors 175 will be selected and the slits 152 thereof laid open and the conductors 175 laid into the hole 151. The plug 150 will then be slid down the conductors 171 until the plug 150 is in the hole 112 of the grommet 110. It should be observed that at this time, the bolts 160 couple the upper and lower compression plates, but are not sufficiently tightened to apply any pressure to the grommet 110. The entire electrical fitting 100, except for the upper compression plate 101, is now passed through the hole 184 in the junction box 183 (see FIG. 5). Thereafter, the fitting 100 is pressed into the hole 181 through the barrier 182. Normally a small portion of the grommet 110 would be allowed to extend above the upper level of the barrier 182. Thereafter, when the grommet is compressed, it will swell outward to provide a water seal and to more securely seal the upper compression plate 101 to the box 183 even if the fitting 100 is dislodged from the penetration hole 181. When the bolts 160 are turned, the upper and lower compression plates 101 and 120, respectively, are brought closer together and thereby compress the grommet 110 therebetween. In response to the compressive forces applied to the grommet 110, it will securely grasp the plug 150 and also expand outward to engage with the surface 185 of the hole 181 through the barrier 182. In addition, the edge 105 of the upper compression plate will be caused to dig into the lower surface 186 of the junction box 183. By this means, a continuity of ground is provided from the armored cable 171 through the cable clamp 130 and the tail 121 to the lower compression plate 120 and thence through the bolts 160 to the upper compression plate 101 and the junction box 183. If desired, the upper compression plate 101 could include a plurality of dimples or other means to make grounding connection to the box 183.

The junction box 183 will be securely held against the barrier 182 and because of the pressure of the edges 105 against the surface 186 of the junction box 183, rotation of the junction box 183 will be inhibited and no other fastening devices are required.

From the foregoing, it will be readily apparent that the hole 181 through the barrier 182 is completely sealed by the electrical fitting 100 and that liquids, flame or other products of combustion cannot pass from one side of the barrier 182 to the other.

The relatively small diameter of the hole 181 greatly reduces the exposed area of the fitting 100 to fire conditions should such conditions prevail and, therefore, greatly reduces the possibility of fire damage to the fitting 100.

When the armored cable 172 is one of the larger sizes which may be used, it may be secured by the cable clamp 130 in the manner more fully shown in FIG. 4B. In this application, it will be observed that the armored cable 172 is inserted in such manner that its leading end is just below the spiral clamps 135 and 136. When the bolt 134 is turned to draw together the wings 132, the inner cylindrical surface 131 will clamp the armored cable 172 to provide appropriate clamping and supporting. Except for this distinction, the larger armored cable is connected in substantially the same manner as that set forth with respect to the armored cable 171.

It may also be observed that the lip 127 of the tail 121 may be positioned to engage the spiral groove 173 of the armored cable 171 or 172 and thereby provide an additional means of supporting and clamping the armored cable against pull out forces.

If the cable clamp 140 is substituted for the cable clamp 130, it will be evident that the prepared end of the armored cable is passed through the opening in the cable clamp 140 before the cable is laid into the fitting 100 in the manner described hereinabove and that at the time the bolt 134 of the cable clamp 130 would be tightened, the bolt 141 of the cable clamp 140 is tightened after assuring that the portion of the tail 121 below the off set 126 is inside the cable clamp 140.

When multiconductor telephone cable is used with the fitting 100, there is generally no need for a clamp 130 and 140 as the cable may be supported solely by the friction of the grommet 110.

FIG. 5 illustrates how a telephone cable 190 is supported if the clamp 140 is considered as not being used and it illustrates the use of the clamp 140 if the elongate member 190 is considered to be armored cable or flexible metal conduit. In this latter case, only the individual insulated conductors would pass through the grommet 110.

In FIG. 5, it will be observed that the slit 113 in the grommet 110 is illustrated as being skew to the axis of the grommet 110. The slit 113 could be made as illustrated in either FIGS. 1 or 5. The design of FIG. 5 might provide slightly improved sealing while the design of FIG. 1 might be slightly more convenient for laying in the cable.

It should be understood that the electrical fitting 100 of the present design does not require a junction box 183 on both sides of the barrier 182. This provides an economy and permits installation of the fitting 100 in barriers 182 which are not planar on one side, as illustrated at the bottom of FIG. 5.

As mentioned hereinabove, the hole 122 is not concentric with the grommet 110. This permits the bolts 160 to be diametrically opposed and yet provide a satisfactory wall thickness between the holes 114 and the outer perimeter of the grommet 110 and the hole 112. This also permits an overall design of the fitting 100 with a minimum diameter of the grommet 110 thereby permitting use with a standard junction box provided with or accommodating a one inch trade size knock-out which has a one and three-eighths inch hole.

While there has been shown and described what is considered at the present to be a preferred embodiment of the invention, modifications thereto will readily occur to those skilled in the related arts. For example, the grommet could be made of a plurality of rings and/or have a non-circular perimeter for use with mating holes. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An assembly for facilitating the installation, support, and protection of an elongate member, such as one or more electrical circuit conductors, or a communication cable, to be passed through a hole in a barrier, such as a fire rated concrete floor, or the like, and comprising in combination:
   (a) an upper and lower compression plate;
   (b) a resilient grommet having a passageway therethrough for accommodating an elongate member;
   (c) said upper and lower compression plates each including an opening at least as large as said passageway and in alignment therewith for accommodating the passage of an elongate member;
   (d) fastening means coupling said upper and lower compression plates and drawing them towards each other for compressing said resilient grommet therebetween;
   (e) said lower plate having coupled thereto gripping means for gripping and supporting the elongate member passed through said assembly; and wherein
   (f) said gripping means comprises an appendage on said lower plate having a first portion for clamping elongate members having a first diameter range and a second portion including means for mating with the convolutions of an armored cable or flexible metal conduit having a second diameter range with a maximum diameter smaller than that of said first diameter range.

2. An assembly for facilitating the installation support and protection of an elongate member, such as one or more electrical circuit conductors, or a communication cable to be passed through a hole in a barrier, such as a fire rated concrete floor or the like, and comprising in combination:
   (a) an upper compression plate;
   (b) a resilient and generally cylindrical grommet having a through passageway for accommodating an elongate member placed in said passageway;
   (c) a lower compression plate having a diameter no greater than that of said grommet and further having an opening at least as large, and in alignment with, said passageway of said grommet for accommodating an elongate member placed in said passageway;
   (d) fastening means for coupling said upper and lower compression plates and drawing them together for longitudinal compression of said grommet therebetween;
   (e) said upper compression plate having a width greater than that of said grommet and including an opening at least as large, and in alignment with, said passageway of said grommet for accommodating an elongate member placed in said passageway;
   (f) a member having a generally planar surface and an opening therethrough, which is smaller than said upper compression plate, and which is situated between said upper compression plate and said grommet; and wherein
   (g) said upper compression plate includes portions which project towards said member when said assembly is in place in a hole through a barrier for enabling said portions to exert a high unit pressure, on said member situated between said portions and said barrier, when said fastening means compresses said grommet between said upper and lower compression plates.

3. The combination as set forth in claim 2, wherein said lower compression plate has coupled thereto gripping means for gripping and supporting the elongate member.

4. The combination as set forth in claim 2, wherein said downward projecting portions comprise the outer perimeter of said upper compression plate.

5. The combination as set forth in claim 4, wherein said downward projecting portions provide a void between the lower limits of said downward projecting portions and the underside of said upper compression plate whereby a space is provided for the expansion of said grommet into said void in response to the compression of said grommet.

6. The combination as set forth in claim 2, wherein said gripping means comprises a tail on said lower compression plate and a hose clamp.

7. The combination as set forth in claim 6, wherein said tail includes a tang for providing a retaining loop to retain said hose clamp on said tail.

8. The combination as set forth in claim 6, wherein said tail includes, at its lower end, an inward turned portion for mating with the convolutions of an armored cable or flexible metal conduit.

9. A clamp for facilitating the support and protection of an armored cable or flexible metal conduit and comprising in combination:
   (a) a body section having a generally cylindrical configuration with a longitudinal through passageway and having a longitudinal cut with the edges proximate to the cut turned outward to form wings;
   (b) fastener means coupled to said wings for drawing them together to reduce the cylindrical diameter of said body section;
   (c) first and second legs extending longitudinally from one end of said body section and at diametrically opposed portions of said body section; and
   (d) first and second spiral clamps comprising a bent over portion of said first and second legs, respectively, and having ends configured to approximate the curve and pitch of the spiral groove of an armored cable or flexible metal conduit; whereby
   (e) said body section may be used to clamp armored cable, or flexible metal conduit, having a first range of sizes and said spiral clamps may be used to clamp armored cable, or flexible metal conduit, having a second range of sizes smaller than said first range.

10. The combination as set forth in claim 9, wherein said fastener means includes a bolt.

11. The combination as set forth in claim 10, wherein one of said wing members is threaded to accommodate said bolt.

12. The combination as set forth in claim 9, wherein said clamp is formed of sheet metal.

* * * * *